United States Patent
Yasuda et al.

(10) Patent No.: US 9,896,768 B2
(45) Date of Patent: Feb. 20, 2018

(54) SEALING MEMBER AND METHOD OF MANUFACTURING THE SAME

(71) Applicant: HORIBA STEC, Co., Ltd., Kyoto-shi, Kyoto (JP)

(72) Inventors: Tadahiro Yasuda, Kyoto (JP); Masayuki Nagasawa, Kyoto (JP); Shigeyuki Hayashi, Kyoto (JP)

(73) Assignee: HORIBA STEC, Co., Ltd., Kyoto-shi, Kyoto (JP)

( * ) Notice: Subject to any disclaimer, the term of this patent is extended or adjusted under 35 U.S.C. 154(b) by 91 days.

(21) Appl. No.: 14/133,268

(22) Filed: Dec. 18, 2013

(65) Prior Publication Data

US 2014/0167366 A1    Jun. 19, 2014

(30) Foreign Application Priority Data

Dec. 19, 2012 (JP) .................................. 2012-277020
Nov. 6, 2013 (JP) .................................. 2013-230082

(51) Int. Cl.
*F16J 15/08* (2006.01)
*C23F 1/02* (2006.01)

(52) U.S. Cl.
CPC ............. *C23F 1/02* (2013.01); *F16J 15/0818* (2013.01); *F16J 15/0887* (2013.01)

(58) Field of Classification Search
CPC .. F16J 15/02; F16J 15/062; F16J 15/06; F16J 15/08; F16J 15/0887
See application file for complete search history.

(56) References Cited

U.S. PATENT DOCUMENTS

| | | | | |
|---|---|---|---|---|
| 3,138,937 A | * | 6/1964 | Parkinson | ................ F16J 15/02 141/65 |
| 4,796,897 A | * | 1/1989 | Inciong | ................ F16J 15/123 277/594 |
| 6,523,833 B1 | * | 2/2003 | Ishigaki | ................ F16J 15/062 277/549 |

(Continued)

FOREIGN PATENT DOCUMENTS

| | | |
|---|---|---|
| JP | H05057514 U | 7/1993 |
| JP | H09144886 A | 6/1997 |

(Continued)

OTHER PUBLICATIONS

Japanese Patent Office, Office Action Issued in Application No. 2013230082, dated May 9, 2017, 7 pages.

*Primary Examiner* — Eugene G Byrd
(74) *Attorney, Agent, or Firm* — Alleman Hall Creasman & Tuttle LLP

(57) ABSTRACT

The present invention is mainly intended to provide a sealing member which can be easily manufactured and which is capable of sealing with high accuracy and a method of manufacturing the sealing member, wherein the sealing member is a metallic sealing member that is arranged so as to be interposed between a first surface and a second surface which are facing each other. The sealing member is provided with a first protrusion protruded toward the first surface and a pair of second protrusions protruded toward the second surface, wherein the first protrusion is arranged between the paired second protrusions and distal end portions of the first protrusion and second protrusions are mutually parallel flat surfaces.

12 Claims, 18 Drawing Sheets

(56) References Cited

U.S. PATENT DOCUMENTS

| | | | | |
|---|---|---|---|---|
| 7,004,479 B2* | 2/2006 | Oida | ............... | F16J 15/0881 |
| | | | | 277/626 |
| 7,029,013 B2* | 4/2006 | Yajima | ............... | F16J 15/025 |
| | | | | 206/710 |
| 7,959,161 B2* | 6/2011 | Seki | ............... | F16J 15/061 |
| | | | | 277/630 |
| 8,764,023 B2* | 7/2014 | Furubayashi | ......... | F16J 15/025 |
| | | | | 277/637 |
| 9,109,732 B2* | 8/2015 | Vu | ............... | F16L 23/18 |
| 2008/0258400 A1* | 10/2008 | Anderberg | ............ | F16J 15/024 |
| | | | | 277/314 |
| 2012/0313027 A1* | 12/2012 | Welchner | ............ | F16J 15/024 |
| | | | | 251/318 |
| 2013/0075405 A1* | 3/2013 | Saito | ............... | F04B 27/1036 |
| | | | | 220/328 |
| 2014/0252765 A1* | 9/2014 | Branchet-Cohen | .. | F16J 15/0887 |
| | | | | 285/368 |

FOREIGN PATENT DOCUMENTS

| | | | |
|---|---|---|---|
| JP | 2002031236 A | 1/2002 |
| JP | 2004060842 A | 2/2004 |
| JP | 2004218737 A | 8/2004 |
| JP | 2008057353 A | 3/2008 |
| JP | 2010242858 A | 10/2010 |
| JP | 2013151956 A | 8/2013 |

* cited by examiner

SEALING MEMBER AND METHOD OF MANUFACTURING THE SAME

TECHNICAL FIELD

The present invention relates to a sealing member used for preventing leakage of fluid in, for example, a mass flow controller and the like for controlling a flow rate of gas, and to a method of manufacturing the sealing member.

BACKGROUND ART

There is a metallic sealing member for withstanding use in a harsh condition, preventing leakage of fluid and having airtightness and liquid tightness etc. in structure.

In the case where this metallic sealing member is brought into contact with an object to be sealed by a flat surface, if a front surface is rough, a minute clearance is formed between the sealing member and the object and leakage of fluid occurs. Therefore, as described in, for example, Patent Literature 1, machining such as arc-shaping or sharpening of a contacting portion between the metallic sealing member and the object to be sealed is performed.

CITATION LIST

Patent Literature

Patent Literature 1: JP2010-242858A

SUMMARY OF INVENTION

Technical Problem

However, if machining such as, for example, arc-shaping or sharpening of the contacting portion is performed, there is a problem that a defect such as distortion occurs in the metallic sealing member or chipping thereof occurs and leakage occurs there. As a method of solving such a defect, there can be mentioned such a method that, for example, the distortion is prevented from occurring by performing a precision machining or, for example, a mirror finished of a front surface of the metallic sealing member is performed after machining to thereby repair a chipped portion. However, there arises a new problem in the former that the cost is increased and in the latter that the number of the steps is increased and the manufacture thereof becomes complicated.

Therefore, the present invention has been made to solve the problems, and an essential object thereof is to provide a sealing member which can be easily manufactured and which is capable of sealing with high accuracy and a method of manufacturing the sealing member.

Solution to Problem

That is, the sealing member is a metallic sealing member that is arranged so as to be interposed between a first surface and a second surface which are facing each other. The sealing member includes: a first protrusion protruding toward the first surface; and a pair of second protrusions protruding toward the second surface, wherein the first protrusion is arranged between the paired second protrusions, and distal end portions of the first protrusion and second protrusions are mutually parallel flat surfaces.

With this configuration, since the distal end portions of the first protrusion and second protrusions are mutually parallel flat surfaces, the sealing member can be easily manufactured without the necessity of separately performing machining of portions contacting the first surface and second surface. Moreover, since the machining is not performed, it is possible to prevent defects occurring in the sealing member as described above and the occurrence of leakage can be prevented.

Further, in the sealing member of the present invention, since an area of the flat surface of the first protrusion contacting the first surface is smaller than an area of the flat surfaces of the second protrusions contacting the second surface, a surface pressure applied to the flat surface of the first protrusion becomes higher than a surface pressure applied to the flat surfaces of the second protrusions. Therefore, since the flat surface of the first protrusion is pressed by the first surface, it is possible to seal without the occurrence of leakage even if a front surface of the sealing member or a target structure to be sealed is rough.

In addition, in the case where a force is applied to the sealing member from the first and second surfaces, a partial force thereof is effected so as to tilt the second protrusions inwardly from the outside, and therefore the second protrusions are bent inwardly (i.e., toward the groove). Thus, edges of the second protrusions at the groove sides are brought into tight contact with the second surface. Therefore, the second protrusions can be contacted with the second surface at the edges thereof without a clearance, which prevents the occurrence of leakage.

Further, at the time of sealing, a force toward the first surface from the second surface is applied to the sealing member while a force toward the second surface from the first surface is applied to the sealing member as well and the sealing member per se is bent. Therefore, the first protrusion and second protrusions are brought into tight contact with the first surface and second surface, respectively. Thus, the occurrence of leakage can be prevented.

Since the first protrusion is arranged between the paired second protrusions when viewed from the transverse section perpendicular to the extending direction of the sealing member, the sealing member can stand alone at three points of the first protrusion and second protrusions even when no force is applied to the sealing member from the first surface and second surface.

In the sealing member according to the present invention, it is preferable that the distal end portion of the first protrusion is a flat surface which is parallel to the first surface, and the distal end portions of the second protrusions are flat surfaces which are parallel to the second surface.

Since the distal end portion of the first protrusion is a flat surface parallel to the first surface and the distal end portions of the second protrusions are flat surfaces parallel to the second surface, the first protrusion presses the first surface with a uniform pressing force while the second protrusions press the second surface with a uniform pressing force. Therefore, it is possible to prevent the occurrence of leakage more reliably while preventing the forces from being unbalanced.

In the sealing member according to the present invention, it is preferable that, in a transverse section perpendicular to an extending direction of the sealing member, a side surface of the first protrusion is curved so that a width of the first protrusion is widened toward the second surface from the first surface, and a side surface of each of the second protrusions is curved so that a width of each of the second protrusions is widened toward the first surface from the second surface.

With this configuration, since the groove formed between the paired second protrusions is arch-shaped, it is possible to prevent the second protrusions from rupturing or the like by dispersing the force applied to the second protrusions.

In the sealing member according to the present invention, it is preferable that the flat surfaces of the first protrusion and second protrusions are polished.

With this configuration, since it is possible to remove roughness of the front surfaces of the first protrusion and second protrusions, it is possible to improve the sealing performance.

In the sealing member according to the present invention, it is preferable that the shape of the transverse section is a symmetrical shape.

With this configuration, since the forces applied to the first and second protrusions are made uniform, it is possible to prevent the occurrence of leakage due to, for example, reduction in surface pressure for pressing the first surface by the flat surface of the first protrusion to be made small, or such as rupturing of the second protrusions due to a force concentrating to one of the second protrusions, which are caused by the force applied to the sealing member being biased or unbalanced.

Further, as a method of manufacturing the sealing member described above, there can be mentioned a method of manufacturing a sealing member which is a metallic sealing member arranged so as to be interposed between a first surface and a second surface which are facing each other, including:

disposing a metal member having mutually parallel front and rear surfaces so that the front surface faces the first surface and the rear surface faces the second surface;

a first step of masking a predetermined region of the front surface of the metal member and etching from the front surface side thereof to form a first remaining portion that is not removed by the etching, wherein the first remaining portion is formed as a first protrusion protruding toward the first surface; and a second step of masking a predetermined region of the rear surface of the metal member and etching from the rear surface side thereof to form a second remaining portion that is not removed by the etching, wherein the second remaining portion is formed as a pair of second protrusions protruding toward the second surface, wherein the first protrusion formed in the first step is arranged between the paired second protrusions formed in the second step.

In general, since a metallic sealing member is manufactured while winding a metal member around a tubular product, the shape thereof has been conventionally limited to an annular shape. In contrast, since the sealing member of the present invention is manufactured by etching, it can be formed to have any shape.

In the method of manufacturing the sealing member described above, it is preferable that a vertical distance from a bottom of a groove formed between the paired second protrusions to the second surface is equal to or larger than a vertical distance from an intersection at which the first remaining portion and the second remaining portion meet at the second surface.

With this configuration, since the regions removed in the first etching step and the regions removed in the second etching step are overlapped, the sealing member can be removed from the metal member by two rounds of etching and can be easily manufactured. Further, since machining is not needed when the sealing member is removed from the metal member, it is possible to prevent a defect such that the sealing member is distorted or chipped, and leakage can be prevented more accurately.

Further, in the method of manufacturing the sealing member described above, it is preferable that a vertical distance from the intersection at which the first remaining portion and the second remaining portion meet at the second surface is smaller than a vertical distance from the intersection at which the first remaining portion and the second remaining portion meet at the first surface.

With this configuration, by making the vertical distance from the intersection at which the first remaining portion and the second remaining portion of each of the second protrusions meet at the second surface further smaller, it is possible to prevent the second protrusions from rupturing due to a force applied to the second protrusions.

Advantageous Effects of Invention

According to the present invention configured as described above, since the first protrusion to be brought into contact with the first surface and the second protrusion to be brought into contact with the second surface are respectively flat surfaces, it is not necessary to perform a machining, and the sealing member can be easily manufactured and the defect due to the machining is prevented to thereby prevent the leakage of fluid. In addition, since the surface pressure between the first protrusion and the first surface is enhanced and the edges of the second protrusions are brought into contact with the second surface at various points, the leakage can be further prevented.

DESCRIPTION OF EMBODIMENTS

The following describes a sealing member 1 according to one embodiment of the present invention with reference to the accompanying drawings.

This sealing member 1 is intended to be used for preventing leakage of fluid of, for example, a mass flow controller or the like. The sealing member 1 is arranged so as to be interposed between a member having a first surface 100 and a member having a second surface 101.

Figure 1:
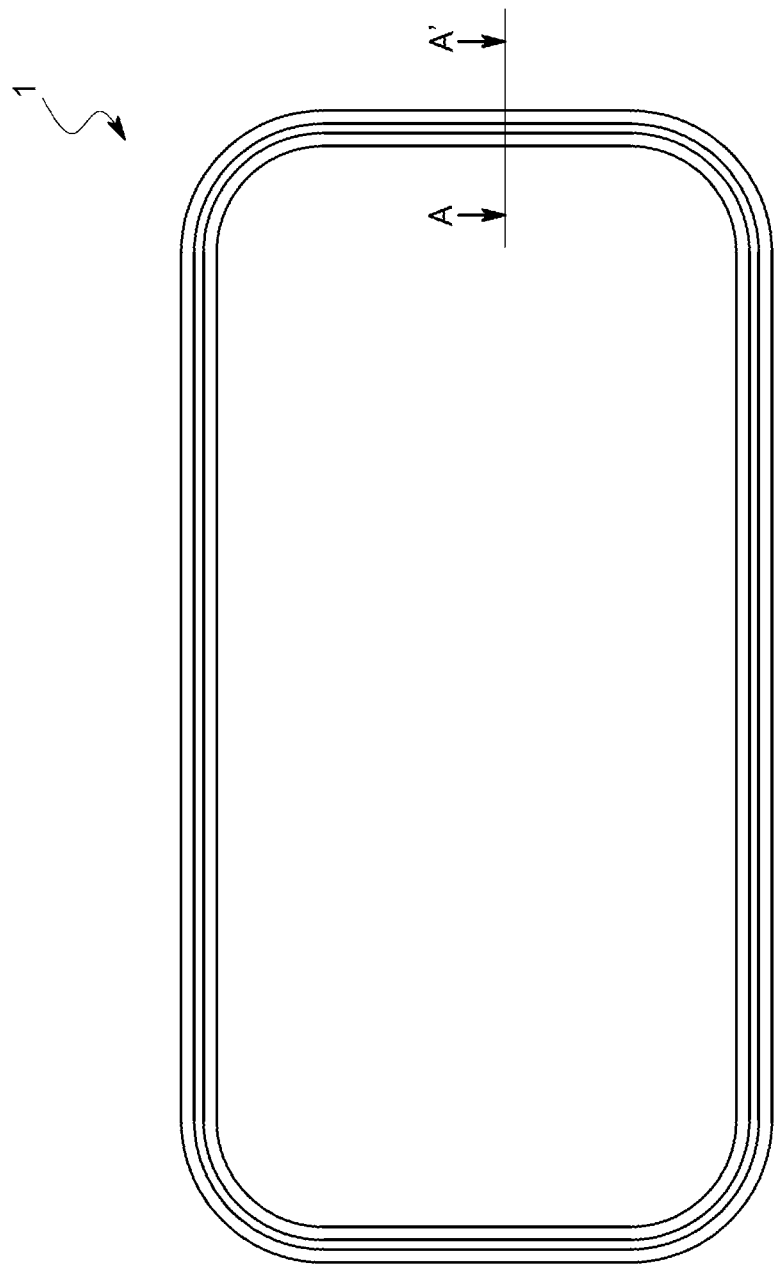
FIG. 1 is a plan view showing a sealing member of one embodiment of the present invention.

Then, as shown in FIG. 1, this sealing member 1 has a substantially rectangular annular shape and it is made of a metal material such as, for example, SUS316L having a high corrosion resistance.

Figure 2:
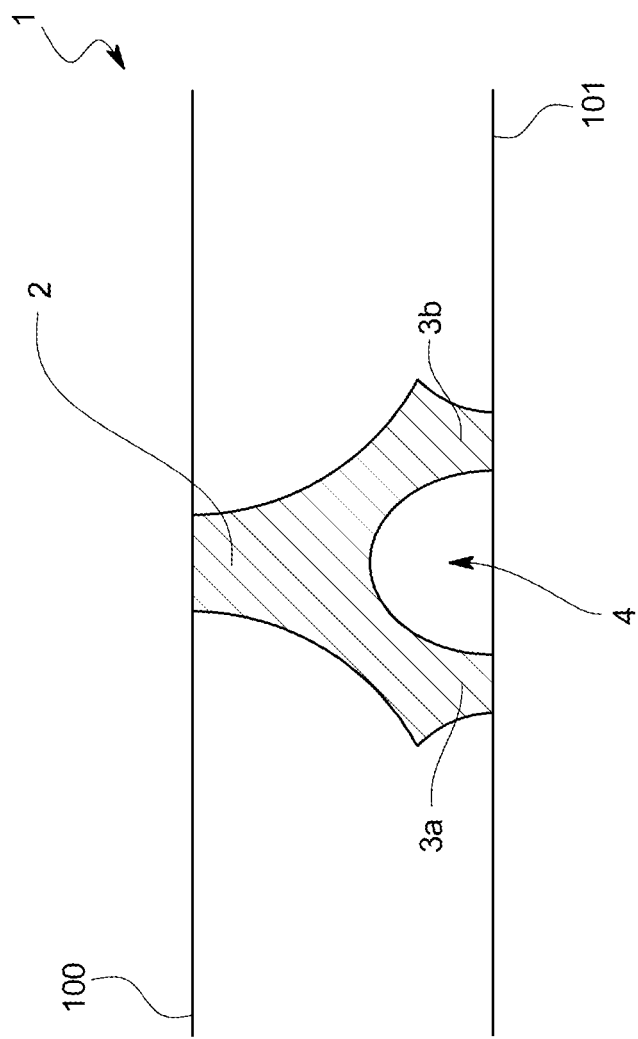
FIG. 2 is a sectional view of the sealing member of the same embodiment taken along a line AA' in FIG. 1.

FIG. 2 shows a cross section of this sealing member 1 taken along a line AA' shown in FIG. 1, that is, a transverse section perpendicular to an extending direction of the sealing member 1. As shown in FIG. 2, this sealing member 1 includes a first protrusion 2 protruding toward the first surface 100 and a pair of second protrusions 3a and 3b protruding toward the second surface 101.

The first protrusion 2 has its distal end portion formed as a flat surface which is arranged so as to be parallel to the first surface 100. As shown in FIG. 2, both side surfaces of the first protrusion 2 are curved so that the width of the first protrusion 2 becomes wider as it leaves from the first surface 100 toward the second surface 101.

Each of the paired second protrusions 3a and 3b has its distal end portion formed as a flat surface which is arranged so as to be parallel to the second surface 101. As shown in FIG. 2, both side surfaces of each of the second protrusions 3a and 3b are curved so that the width of each of the second protrusions 3a and 3b becomes wider as it leaves from the second surface 101 toward the first surface 100, and an arch-shaped groove 4 is formed between the paired second protrusions 3a and 3b. It is noted that the flat surfaces of the first protrusion 2 and the paired second protrusions 3a and 3b may be polished.

In FIG. 2, the first protrusion 2 is interposed between the paired second protrusions 3a and 3b so that the sealing member 1 has a symmetrical shape when viewed from the transverse section perpendicular to the extending direction of the sealing member 1.

The following describes a method of manufacturing the sealing member 1 according to one embodiment of the present invention with reference to the drawings.

This sealing member 1 is manufactured through a first step and second step in this order.

Figure 3:
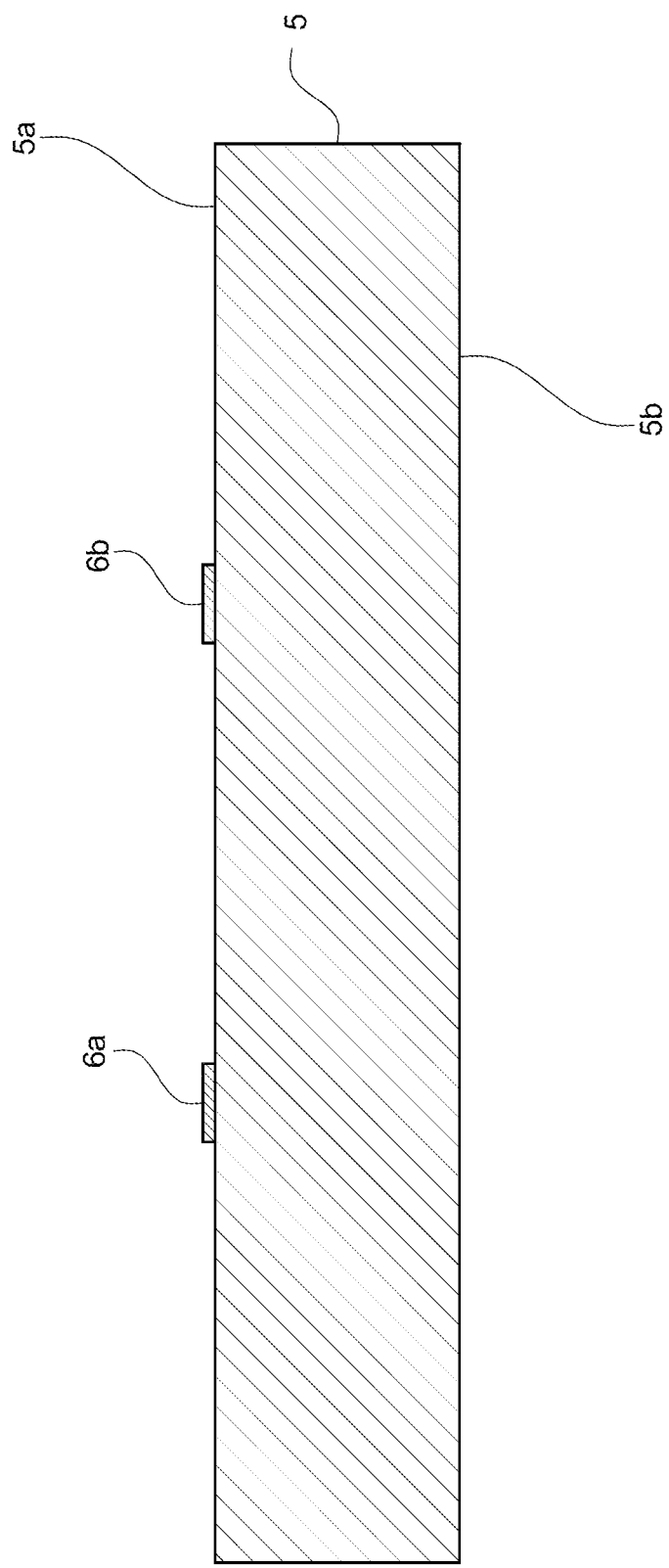
FIG. 3 is a sectional view showing a first step of a manufacturing method of the sealing member of the same embodiment taken in a thickness direction of a metal plate.

The first step is described below. FIGS. 3 to 7 are sectional views taken in a thickness direction of a metal plate 5. In the first step, as shown in FIG. 3, a predetermined annular region of a front surface 5a of the metal plate 5 having mutually parallel front and rear surfaces with a predetermined thickness is covered with an anticorrosive first mask 6 (6a, 6b). Then, an etching is performed from a side of the front surface 5a of the metal plate 5 using an etching solution such as, for example, Nital etc. It is noted that a known etching solution is appropriately selected in accordance with the metal plate 5.

Figure 4:
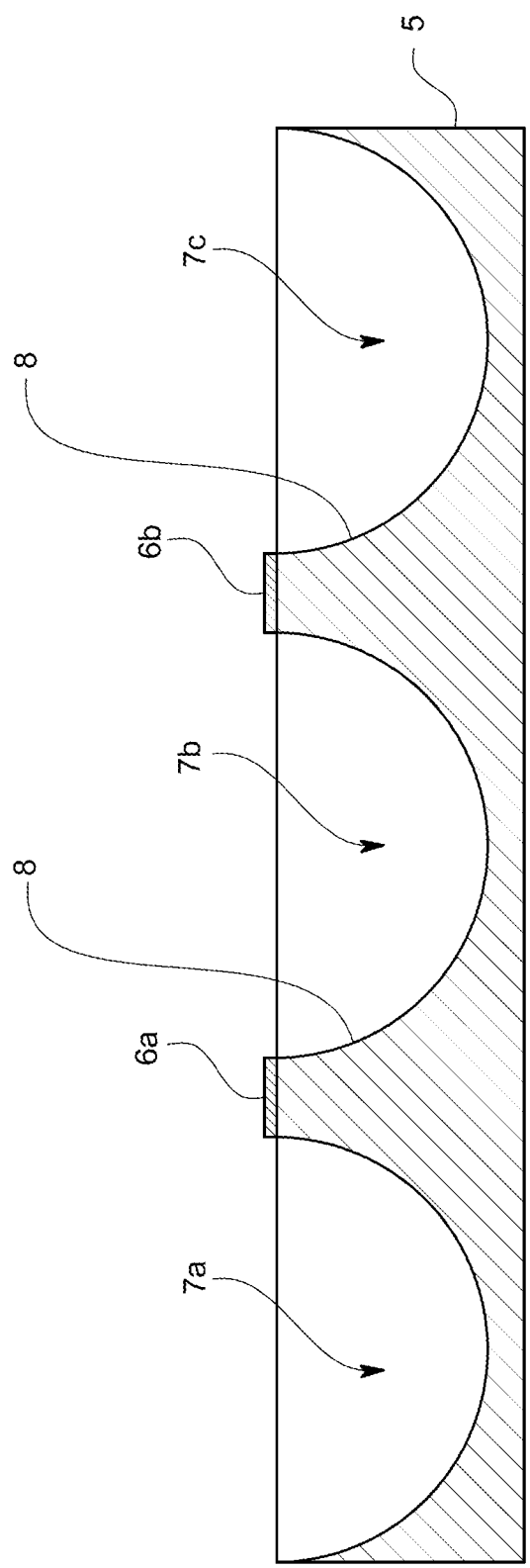
FIG. 4 is a sectional view showing the first step of the manufacturing method of the sealing member of the same embodiment taken in the thickness direction of the metal plate.

By this etching, in the regions covered with the first mask 6, there are formed two first remaining portions 8 each of which protrudes from the rear surface 5b toward the front surface 5a of the metal plate 5 while the width thereof becomes narrower as shown in FIG. 4. The distal end portions of the first remaining portions 8 have flat surfaces each of which is a part of the front surface 5a per se of the metal plate 5 covered with the first mask. The inside and outsides of the two first remaining portions 8 become first removal regions 7 (7a, 7b, 7c) where the metal plate 5 has been removed.

Figure 5:
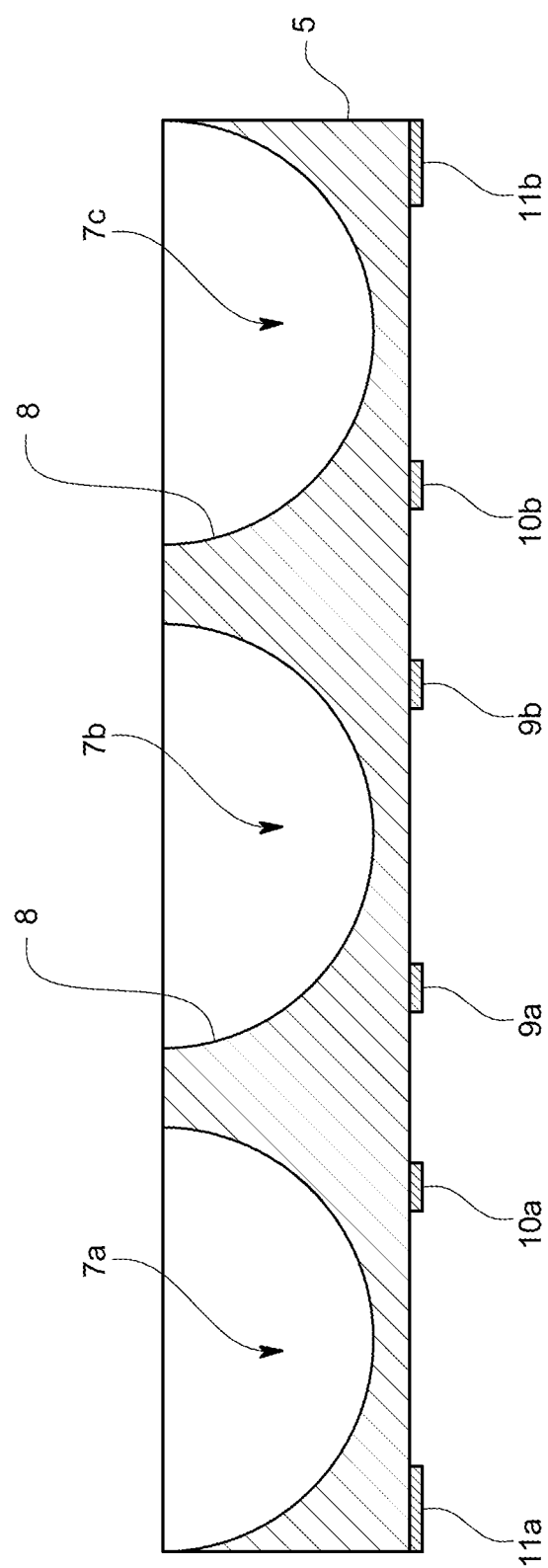
FIG. 5 is a sectional view showing a second step of the manufacturing method of the sealing member of the same embodiment taken in the thickness direction of the metal plate.

The second step is described below. In the second step, as shown in FIG. 5, predetermined annular regions of the rear surface 5b of the metal plate 5 subjected to the first step described above are covered with a second mask 9 (9a, 9b), a third mask 10 (10a, 10b) and a fourth mask 11 (11a, 11b), respectively. These masks 9 to 11 are arranged so that the second mask 9 is surrounded by the third mask 10 and the third mask 10 is surrounded by the fourth mask 11. The first remaining portions 8 are respectively arranged between the second masks 9 and the third masks 10 when viewed from the section taken in the thickness direction of the metal plate 5. Then, an etching is performed from a side of the rear surface 5b of the metal plate 5 using the etching solution.

Figure 6:
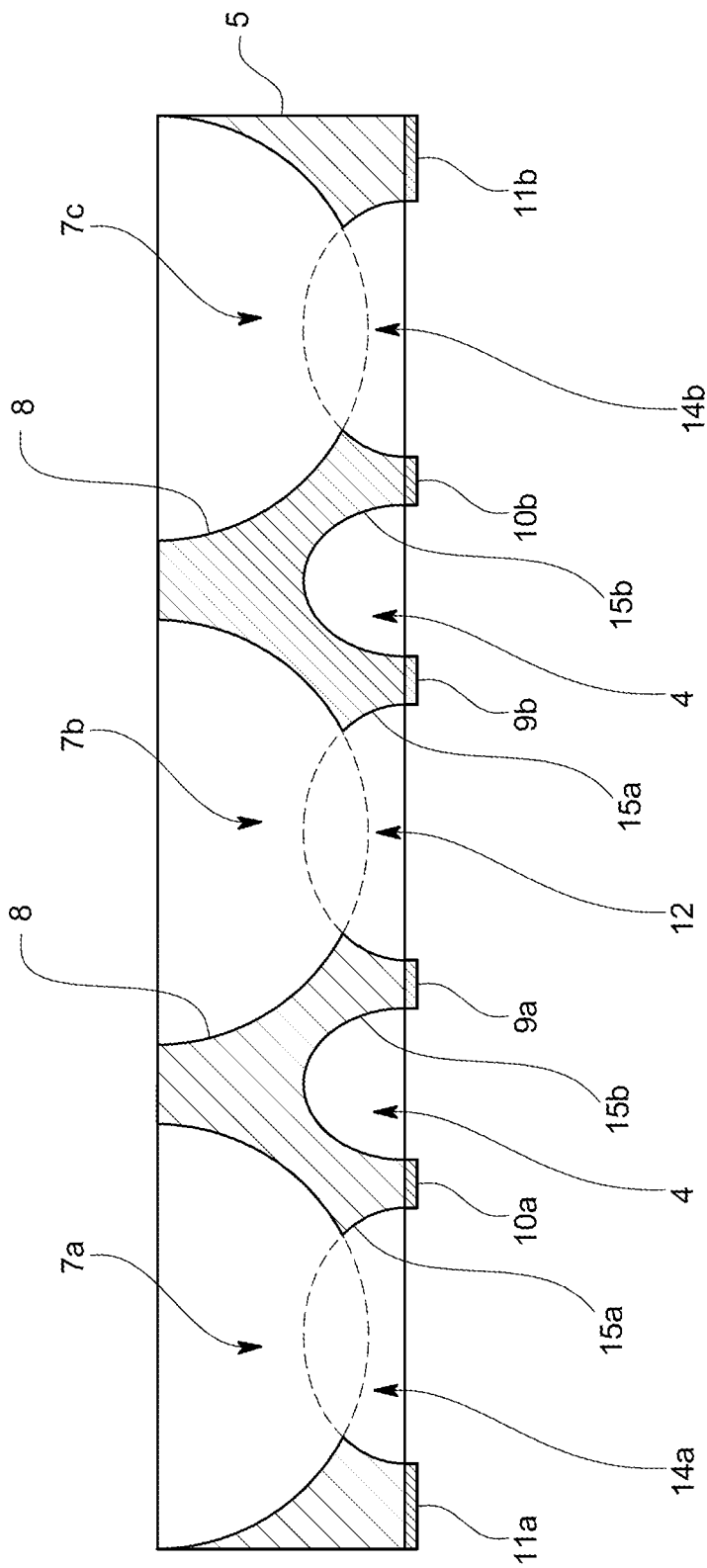
FIG. 6 is a sectional view showing the second step of the manufacturing method of the sealing member of the same embodiment taken in the thickness direction of the metal plate.

By this etching, in the regions covered with the second masks 9 (9a, 9b) and third masks 10 (10a, 10b), there are formed two pairs of second remaining portions 15a and 15b to be symmetrical when viewed from the section taken in the thickness direction of the metal plate 5, wherein each of the second remaining portions 15a and 15b protrudes from the front surface 5a toward the rear surface 5b of the metal plate 5 while the width thereof becomes narrower as shown in FIG. 6. The distal end portions of the second remaining portions 15a and 15b have flat surfaces which are parts of the rear surface 5b per se of the metal plate 5 covered with the second mask 9 and third mask 10. Thus, an arch-shaped groove 4 is formed between each pair of the second remaining portions 15a and 15b in a side of the rear surface 5b of the metal plate 5 while the first remaining portion 8 is arranged in a side of the front surface 5a of the metal plate 5.

The regions except the portions covered with the second masks 9, third masks 10 and fourth masks 11 become removal regions where the metal plate 5 is removed, wherein the second removal region 12 formed inside the second masks 9 (9a, 9b) is overlapped (i.e., communicated) with the first removal region 7b where the metal plate 5 is removed in the first etching step to thereby form a first through hole. Also, the third removal regions 14a and 14b formed between the third mask 10 (10a, 10b) and the fourth mask 11 (11a, 11b) are respectively overlapped (i.e., communicated) with the first removal regions 7a and 7c to thereby form second through holes.

Figure 7:
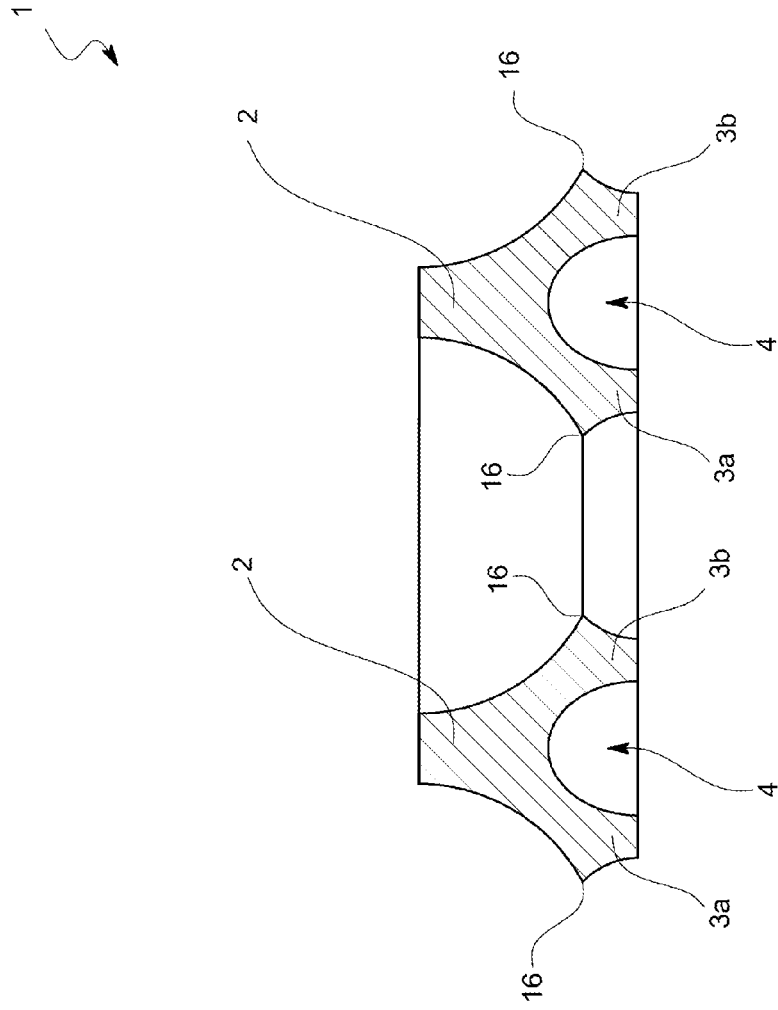
FIG. 7 is a sectional view of the sealing member of the same embodiment.

Thus, as shown in FIG. 7, the metal plate 5 subjected to the first and second steps and remaining between the second through holes becomes the sealing member 1. This sealing member 1 is formed in a ring shape in which the first through hole is formed inside thereof. Then, the front surface 5a of the metal plate 5 is placed on the side of the member having the first surface 100 and the rear surface 5b of the metal plate 5 is placed on the side of the member having the second surface 101. Thus, the first remaining portion 8 of the sealing member 1 becomes the first protrusion 2 protruding toward the first surface 100 and each pair of the second remaining portions 15a and 15b becomes the paired second protrusions 3a and 3b protruding toward the second surface 101. The arch-shaped groove 4 is formed between each paired second protrusions 3a and 3b.

Further, the first remaining portion 8 and the second remaining portions 15a and 15b formed by the etchings in the first and second steps meet at intersections 16, and a vertical distance from each of the intersections 16 to the second surface 101 is shorter than a vertical distance from a bottom of the groove 4 to the second surface 101.

Moreover, the vertical distance from each of the intersections 16 where the first remaining portion 8 and the second remaining portions 15a and 15b meet to the second surface 101 is shorter than the vertical distance from each of the intersections 16 where the first remaining portion 8 and the second remaining portions 15a and 15b meet to the first surface 100.

According to the present invention, since the distal end portions of the first protrusion 2 and second protrusions 3a and 3b are flat surfaces, the sealing member 1 can be easily manufactured without necessity of separately performing machining and the like of portions contacting the first surface 100 and second surface 101. Moreover, since the machining and the like is not performed, it is possible to prevent defects occurring in the sealing member 1 and the occurrence of leakage can be prevented.

Further, in the sealing member 1 of the present invention, since an area of the flat surface of the first protrusion 2 contacting the first surface 100 is smaller than an area of the flat surfaces of the paired second protrusions 3a and 3b contacting the second surface 101, a surface pressure applied to the flat surface of the first protrusion 2 becomes higher than a surface pressure applied to the flat surfaces of the second protrusions 3a and 3b. Therefore, since the flat surface of the first protrusion 2 is pressed by the first surface 100, it is possible to seal without occurrence of leakage even if a front surface of the sealing member 1 or a target structure is rough. Here, the surface pressure applied to the flat surface of the first protrusion 2 can be made higher by reducing the area of the flat surface of the first protrusion 2. Therefore, it is possible to control the surface pressure of the flat surface of the first protrusion 2 by changing the area thereof.

Figure 9:
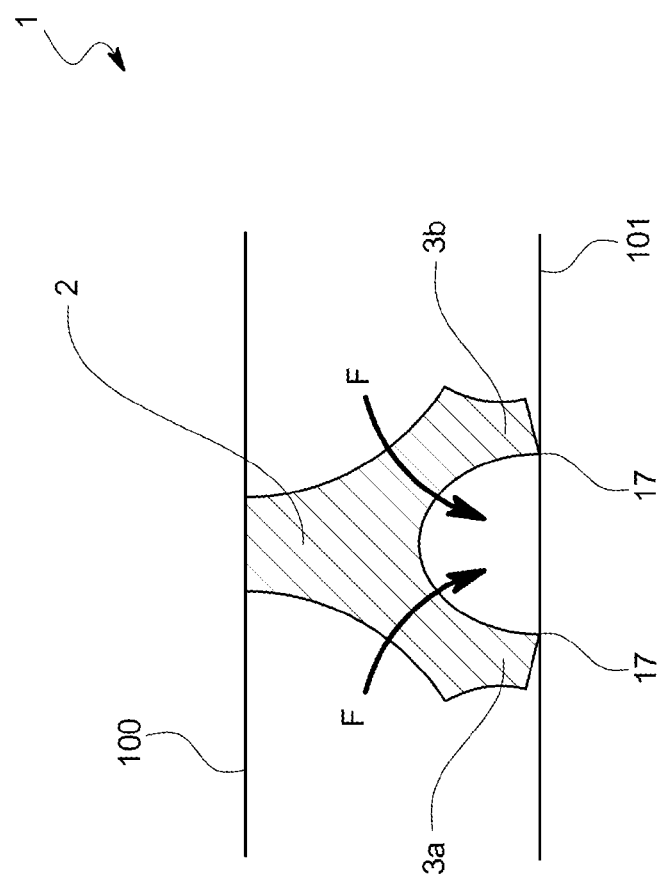
FIG. 9 is an end view showing a sealing time of the present invention.

In addition, as shown in FIG. 9, in the case where force is applied to the sealing member 1 from the first and second surfaces 100 and 101, a partial force F thereof is effected so as to tilt the second protrusions 3a and 3b inwardly from the outside, and therefore the second protrusions 3a and 3b are bent inwardly (i.e., toward the groove 4). Thus, the edges 17 of the second protrusions 3a and 3b at the inner surface sides of the groove 4 are brought into tight contact with the second surface 101. Therefore, the second protrusions 3a and 3b can be contacted with the second surface 101 at the edges thereof without a clearance while preventing the occurrence of leakage.

Further, at the time of sealing, a force toward the first surface 100 from the second surface 101 is applied to the sealing member 1 while a force toward the second surface 101 from the first surface 100 is applied to the sealing member 1 as well and the sealing member 1 per se is bent.

Therefore, the first protrusion 2 and second protrusions 3a and 3b are brought into tight contact with the first surface 100 and second surface 101, respectively. Thus, the occurrence of leakage can be prevented.

Moreover, since the distal end portion of the first protrusion 2 is a flat surface parallel to the first surface 100 and the distal end portions of the second protrusions 3a and 3b are flat surfaces parallel to the second surface 101, the first protrusion 2 presses the first surface 100 with a uniform pressing force while the second protrusions 3a and 3b press the second surface 101 with a uniform pressing force. Therefore, it is possible to prevent the occurrence of leakage more reliably while preventing the forces from being unbalanced.

Since the first protrusion 2 is arranged between the paired second protrusions 3a and 3b when viewed from the transverse section perpendicular to the extending direction of the sealing member 1, the sealing member 1 can stand alone at three points of the first protrusion 2 and second protrusions 3a and 3b when no force is applied to the sealing member 1 from the first surface 100 and second surface 101.

Further, since the groove 4 formed between the paired second protrusions 3a and 3b is arch-shaped, it is possible to prevent the second protrusions 3a and 3b from rupturing or the like by dispersing the force applied to the second protrusions 3a and 3b.

In the case where the flat surfaces of the first protrusion 2 and second protrusions 3a and 3b are polished, it is possible to improve the sealing performance by removing roughness of the surfaces.

Furthermore, since the shape of the sealing member 1 is symmetrical when viewed from the transverse section perpendicular to the extending direction thereof, it is possible to prevent the occurrence of leakage caused by, for example, reduction in surface pressure for pressing the first surface 100 by the flat surface of the first protrusion 2 due to the force applied to the sealing member 1 being biased or unbalanced or such as rupturing of the second protrusions 3a and 3b due to a force applied too much to any one of the second protrusions 3a and 3b.

According to the method of manufacturing the sealing member 1 having the above configuration, since the sealing member 1 is manufactured by etching, the sealing member 1 of any shape can be manufactured.

Further, according to the method of manufacturing the sealing member 1 having the above configuration, since the vertical distance from each of the intersections 16 where the first remaining portion 8 and the second remaining portions 15a and 15b meet to the second surface 101 is shorter than the vertical distance from the bottom of the groove 4 to the second surface 101, the first removal regions 7a and 7c and the third removal regions 14a and 14b are respectively overlapped to form the second through holes. Therefore, the sealing member 1 can be removed from the metal member by two rounds of etching in the first and second steps and the sealing member can be easily manufactured. Further, since machining is not needed when the sealing member 1 is removed from the metal member, it is possible to prevent a defect such that the sealing member 1 is distorted or chipped due to performing the machining, and the leakage can be prevented more accurately.

Furthermore, since the vertical distance from each of the intersections 16 where the first remaining portion 8 and the second remaining portions 15a and 15b meet to the second surface 101 is smaller than the vertical distance from each of the intersections 16 where the first remaining portion 8 and the second remaining portions 15a and 15b meet to the first surface 100, by making the vertical distance from each of the intersections 16 of the second protrusions 3a and 3b to the second surface 101 further smaller, it is possible to prevent the second protrusions 3a and 3b from rupturing due to a force applied to the second protrusions 3a and 3b.

The following describes a sealing device 20 using the above sealing member with reference to FIGS. 10 to 18.

Figure 10:
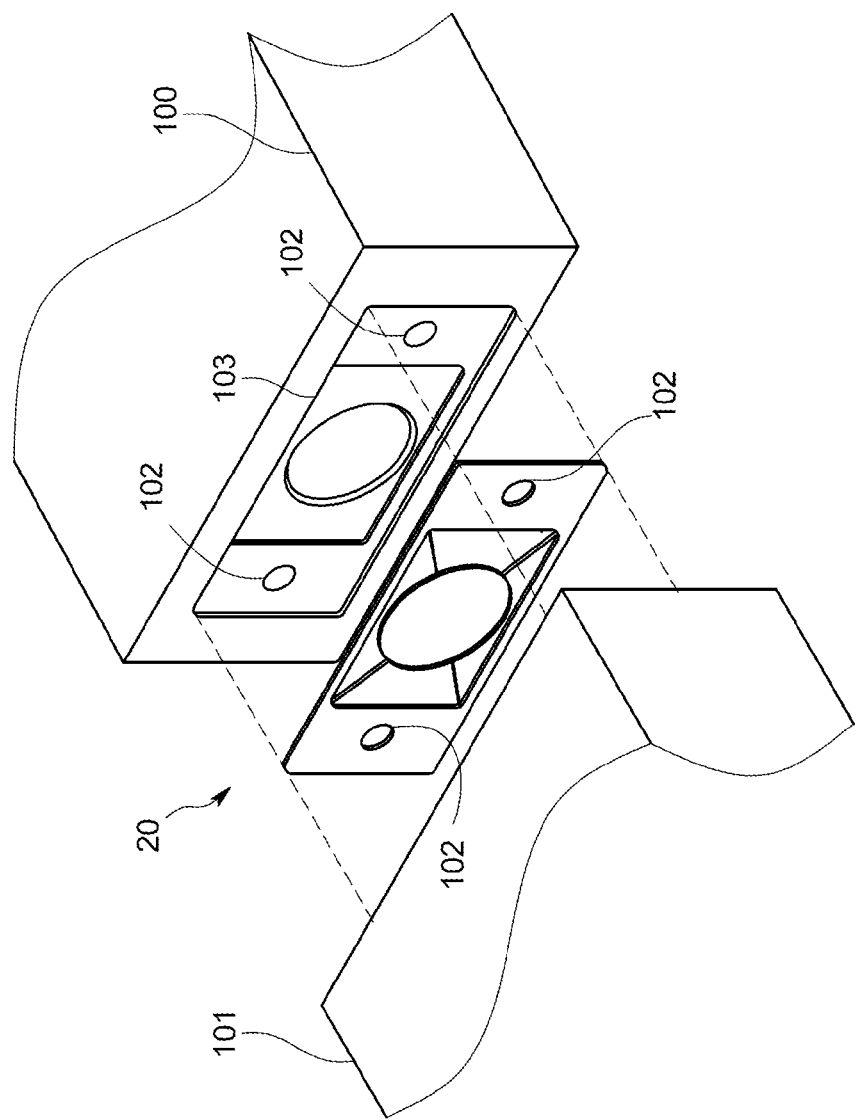
FIG. 10 is a perspective view showing a sealing device according to one embodiment of the present invention.

The sealing device 20 in one embodiment of the present invention is intended to be attached to a section desired to prevent leakage of fluid and it is arranged so as to be interposed between the first surface 100 and the second surface 101 as shown in FIG. 10.

In this configuration, there is formed a groove 103 at least in any one of the first surface 100 or second surface 101 in order to attach the sealing device 20. In the present embodiment, the groove 103 is formed in the first surface 100.

Figure 11:
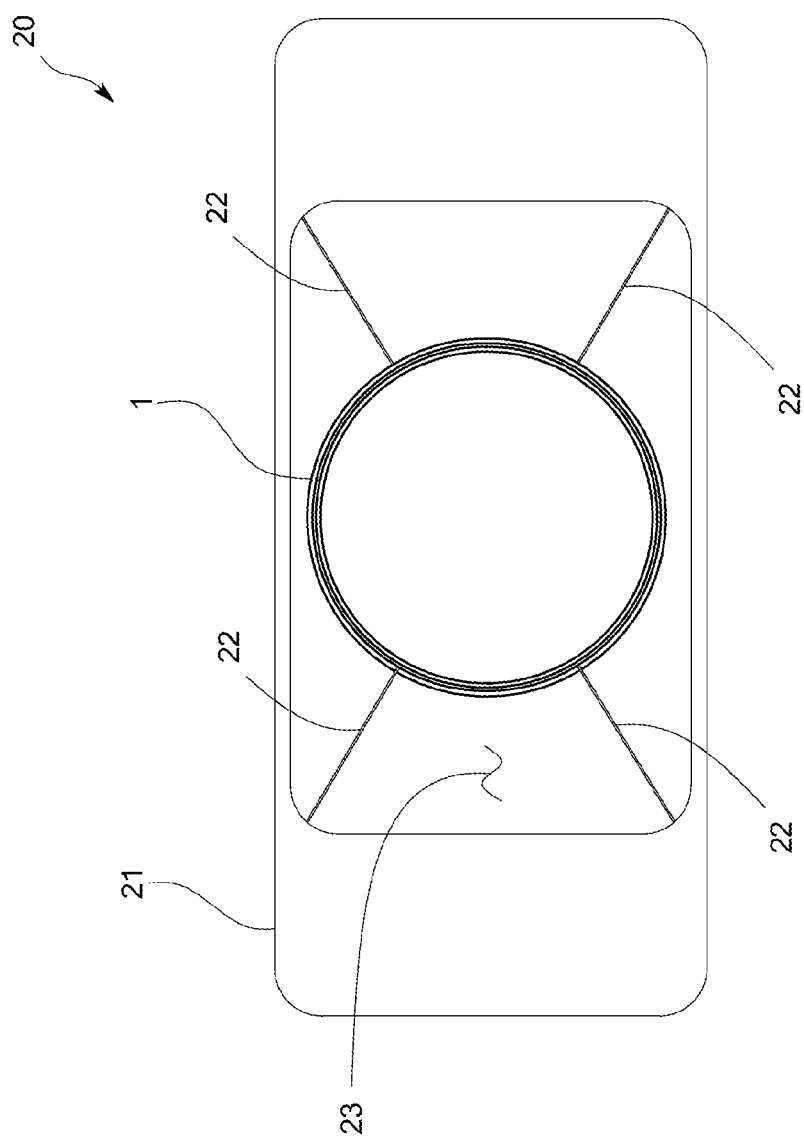
FIG. 11 is a plan view showing the sealing device according to one embodiment of the present invention.

As shown in FIG. 11, the sealing device 20 in the present embodiment is equipped with the sealing member 1 and a retainer member 21. The retainer member 21 is provided in the periphery of the sealing member 1 for retaining the sealing member 1 and this retainer member 21 is positioned on the first surface 100 or second surface 101.

As the sealing member 1 is described above, the description thereof is omitted here. Here, the sealing member 1 in the present embodiment has a substantially annular shape.

The retainer 21 is plate-like shaped, having a through hole 23 formed in the substantially central portion thereof, and the sealing member 1 is accommodated in the through hole 23 via connecting portions 22.

The connecting portions 22 are provided for retaining the sealing member 1 in the through hole 23, and one end of each sealing member 1 is connected to the sealing member 1 and the other end thereof is connected to the retainer member 21. In the present embodiment, four connecting portions 22 are provided diagonally of the retainer member 21, and by the connecting portions 22, the sealing member 1 is disposed so as to be spaced from the end surface of the retainer 21 forming the through hole 23.

As a method of attaching this sealing device 20, the retainer 21 retaining the sealing member 1 is fitted in a groove 103 formed in the first surface 100 and screws are plugged into screw holes 102 formed in the retainer member 21 and first surface 100 and tightened to thereby attach the retainer member 21 to the first surface 100. At this time, the sealing member 1 retained by the retainer member 21 is positioned with respect to the first surface 100. Then, by abutting the first surface 100 and second surface 101 to each other, the sealing device 20 is interposed between the first surface 100 and the second surface 101.

Since the sealing device 20 of the present embodiment configured as described above can easily position the sealing member 1 with respect to the first surface 100 or second surface 101 by the retainer member 21, the sealing member 1 can be easily attached to the first surface 100 or second surface 101.

Further, since the sealing member 1 is disposed so as to be spaced from the end surface of the retainer 21 forming the through hole 23 by the connecting portions 22, the sealing member 1 can be moved more freely compared to a case where the sealing member 1 is connected to the end surface of the retainer 21 forming the through hole 23. Therefore, it is possible to improve a degree of freedom of attachment when the sealing member 1 is attached to the first surface 100 or second surface 101.

Here, if after the sealing member 1 is attached to the first surface 100 or second surface 101, since the sealing member 1 has been already attached to the first surface 100 or second surface 101 to be retained, it may be possible that the connecting portions 22 are cut off and the sealing member 1 is not connected to the retainer member 21.

Without connection between the sealing member 1 and the retainer member 21 by the connecting portions 22, the sealing member 1 is retained only by the first surface 100 or second surface 101, and it is possible to further improve adhesive property between the sealing member 1 and the first surface 100 or second surface 101.

The following describes a method of manufacturing the sealing device 20 configured as described above with reference to FIGS. 12 to 18.

Figure 12:
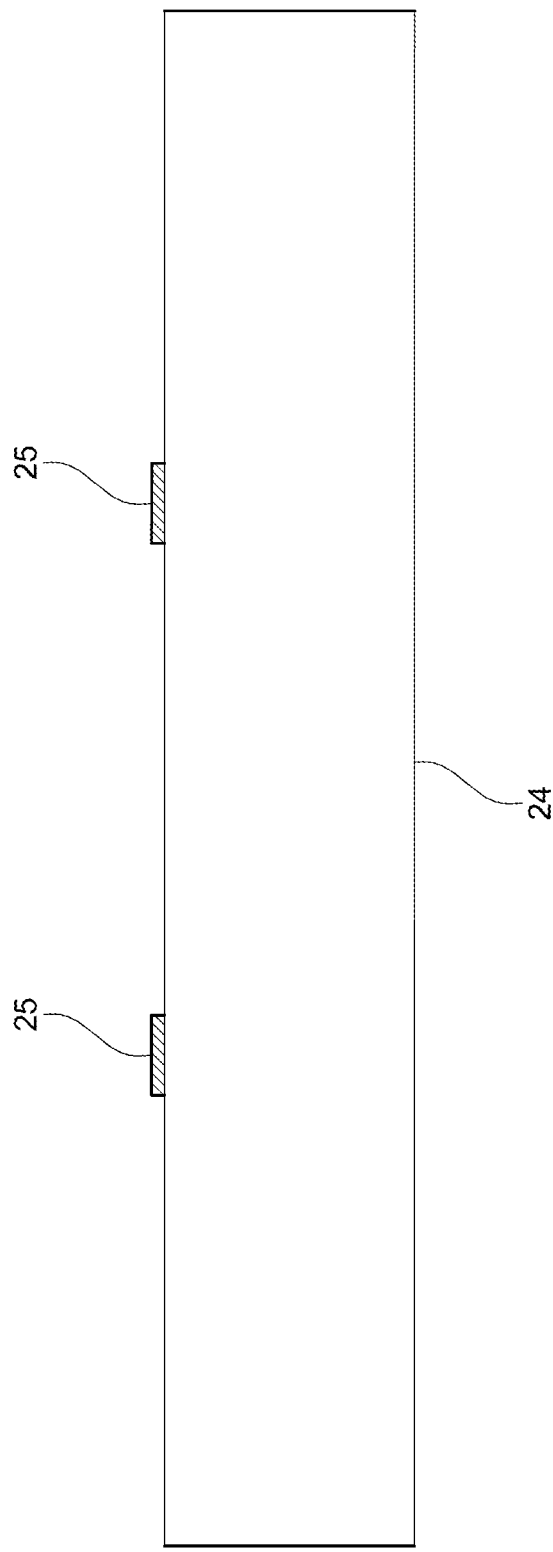
FIG. 12 is a sectional view showing a manufacturing method of the sealing device according to one embodiment of the present invention.

First, as shown in FIG. 12, a predetermined annular region of a front surface of a metal plate 24 is covered with a anticorrosive mask 25 and a first etching step is performed from the front surface side of the metal plate 24 using an etching solution such as, for example, Nital and the like. It is noted that, as with the etching solution, an appropriate known solution can be selected in accordance with the metal plate 24.

Figure 13:
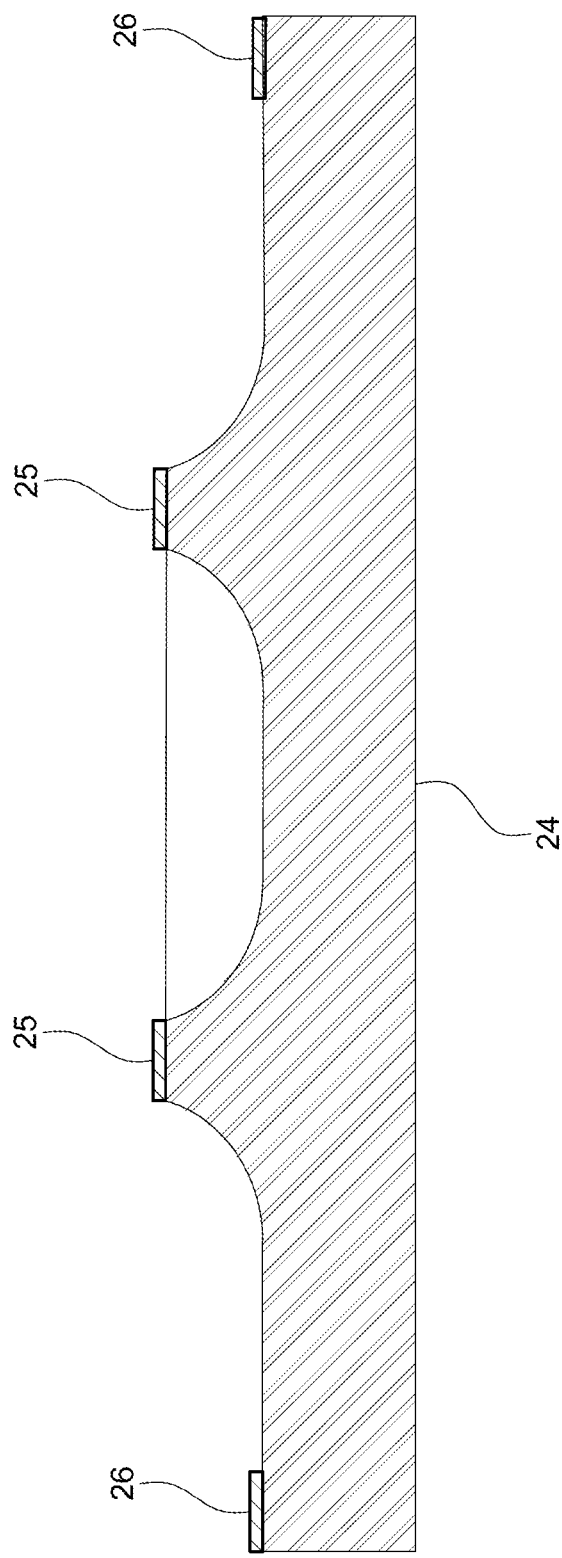
FIG. 13 is a sectional view showing a manufacturing method of the sealing device according to one embodiment of the present invention.
Figure 14:
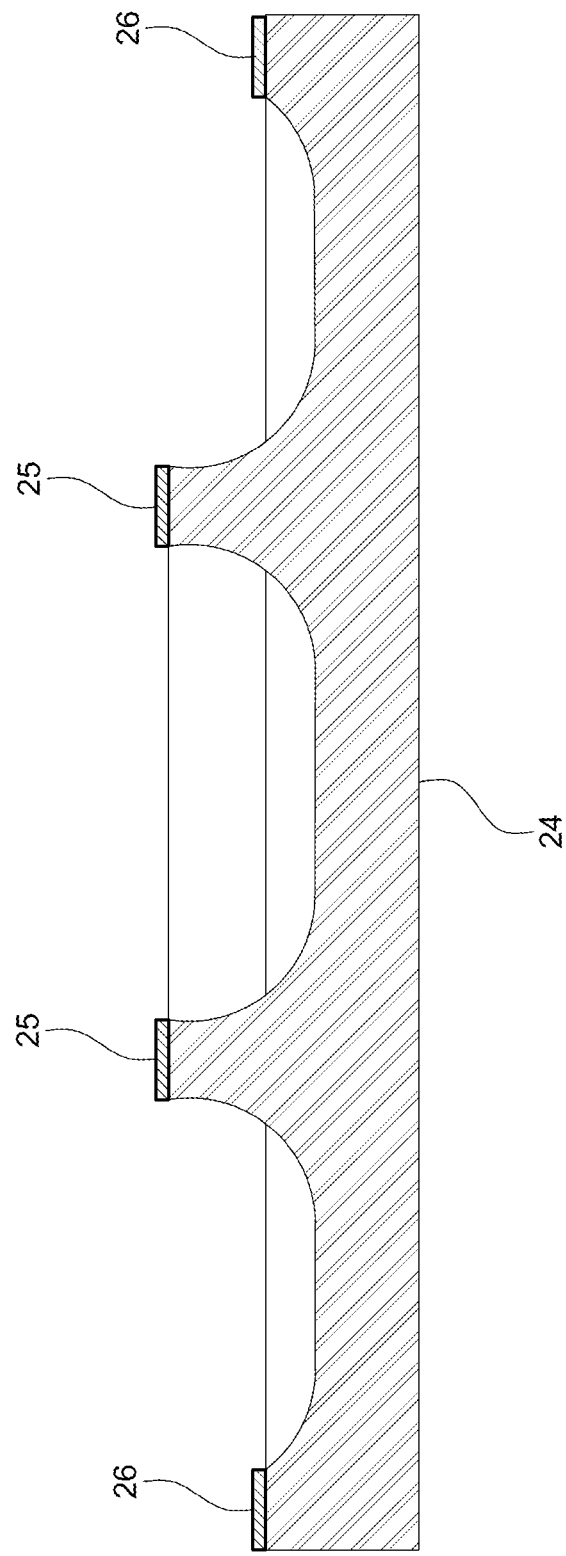
FIG. 14 is a sectional view showing a manufacturing method of the sealing device according to one embodiment of the present invention.

As shown in FIG. 13, after having etched to a predetermined height, the first etching step is ended. Next, as shown in FIG. 14, in addition to the annular region covered with the mask 25 just a while ago, a predetermined region of the front surface of the metal plate 24 is covered with a mask 26 so as to surround the annular region in a substantially rectangular shape. Then, a second etching step is further performed.

Figure 15:
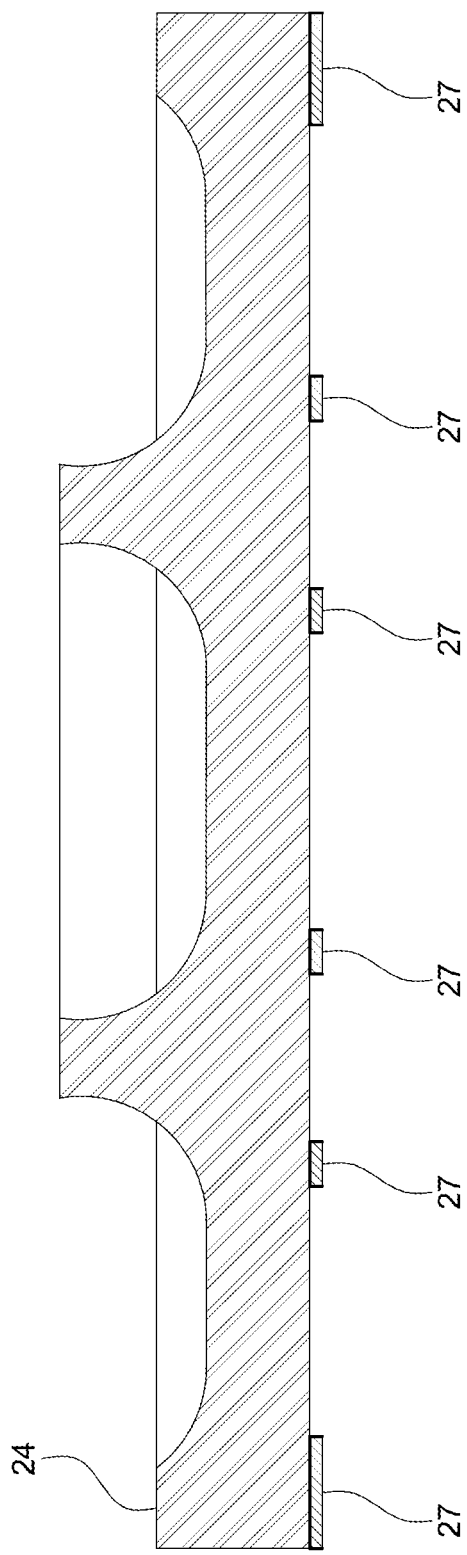
FIG. 15 is a sectional view showing a manufacturing method of the sealing device according to one embodiment of the present invention.

As shown in FIG. 14, after having etched to a predetermined height, the second etching step is ended. Then, as shown in FIG. 15, two predetermined annular regions provided in the rear surface of the metal plate 24 and a region surrounding the two predetermined annular regions in a substantially rectangular shape are covered with masks 27 and a third etching step is performed.

At this time, the masks 27 provided in the two predetermined annular regions in the rear surface of the metal plate 24 are provided so as to interpose the mask 25 provided in the predetermined annular region in the front surface of the metal plate.

Figure 16:
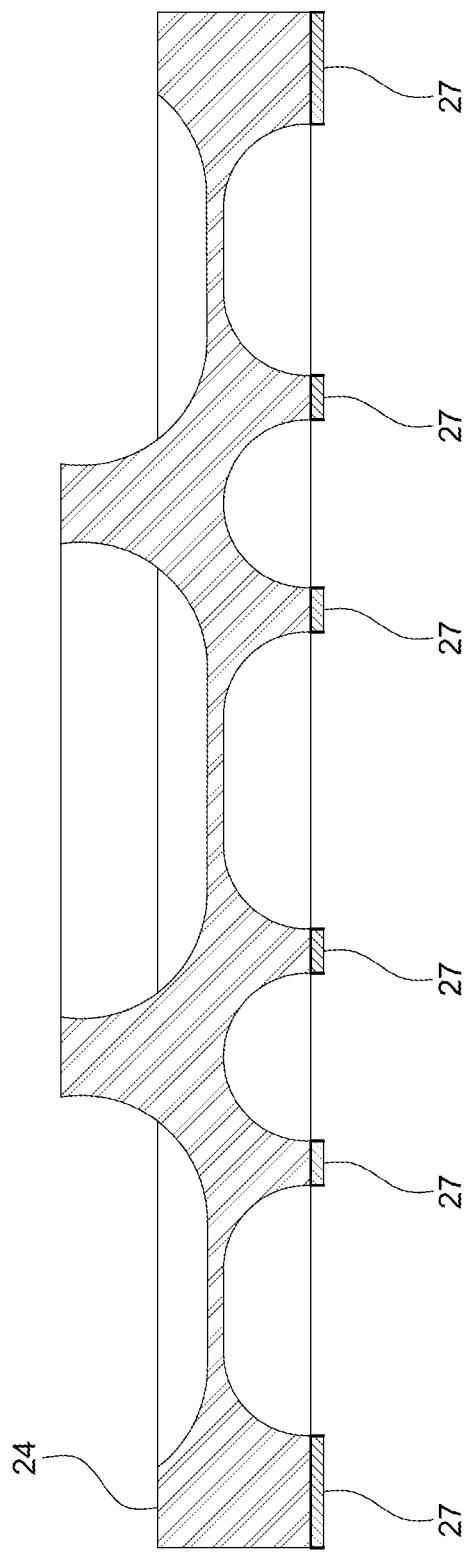
FIG. 16 is a sectional view showing a manufacturing method of the sealing device according to one embodiment of the present invention.
Figure 17:
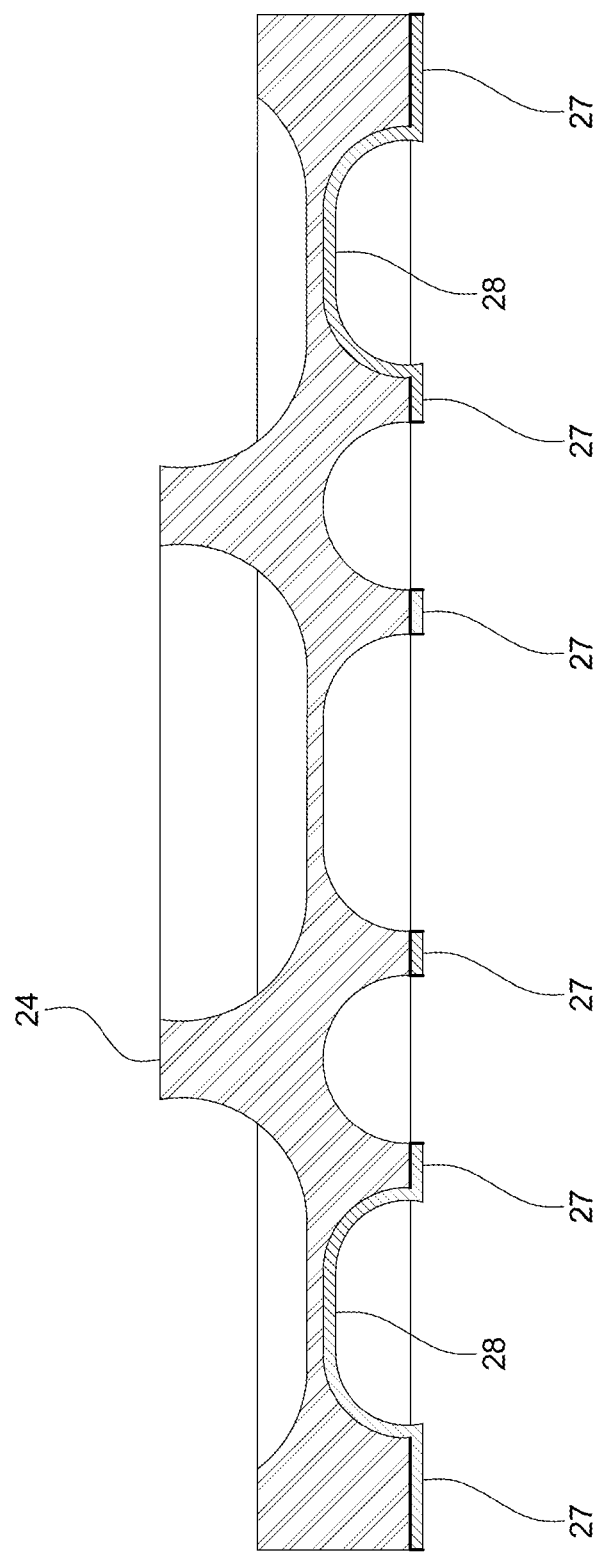
FIG. 17 is a sectional view showing a manufacturing method of the sealing device according to one embodiment of the present invention.

As shown in FIG. 16, after etching to have a predetermined height, the third etching step is ended. Then, as shown in FIG. 17, in addition to the regions covered with the masks 27 in the third etching step, regions connecting in a diagonal shape between the mask 27 provided on the outside region of the two annular regions and the mask 27 provided so as to surround in a substantially rectangular shape are covered with masks 28. Then, a fourth etching step is performed from the rear surface of the metal plate 24.

Figure 18:
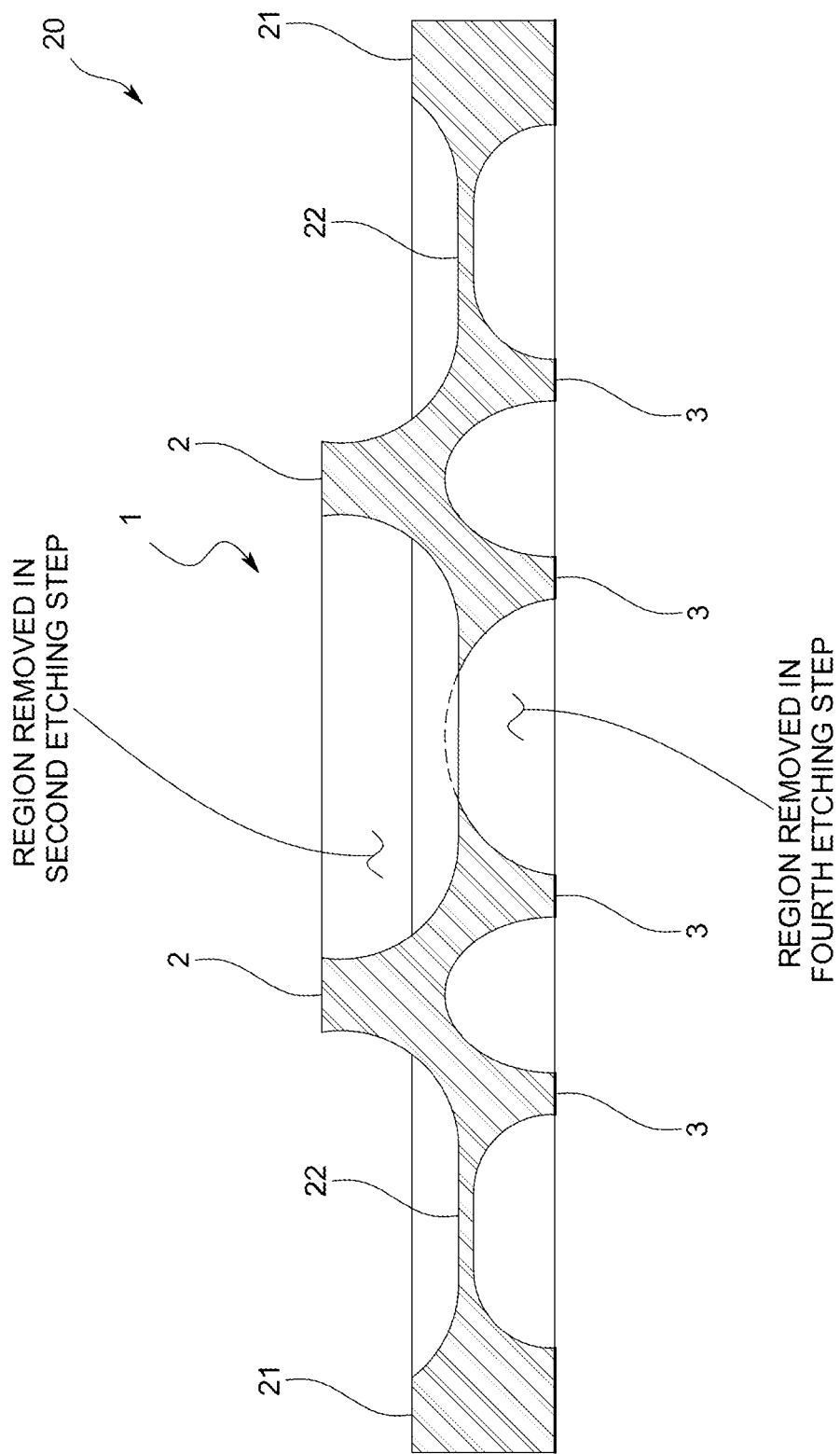
FIG. 18 is a sectional view showing a manufacturing method of the sealing device according to one embodiment of the present invention.

As shown in FIG. 18, the etching is performed until the region removed by etching in the fourth etching step overlaps the removal region removed in the second etching step, and the fourth etching step is ended.

In the metal plate 24 subjected through the above four etching steps, the predetermined annular region covered with the mask 25 in the first and second etching steps becomes the first protrusion 2, and the two predetermined annular regions covered with the masks 27 in the third and fourth etching steps become the second protrusions 3 (3a, 3b).

Further, the portion surrounding the predetermined annular region covered with the mask 26 in the second etching step in the substantially rectangular shape and the portion surrounding the two predetermined annular regions covered with the masks 27 in the third etching step in the substantially rectangular shape become the retainer member 21.

Furthermore, the portions covered with the masks 28 in the fourth etching step become the connecting portions 22 connecting between the sealing member 1 and the retainer member 21.

In the method of manufacturing the sealing device 20 in the present embodiment configured as described above, since the sealing member 1 and the retainer member 21 retaining the sealing member 1 can be manufactured at the same time, the manufacturing cost can be saved.

It is noted that the present invention is not limited to the embodiments described above.

Figure 8:
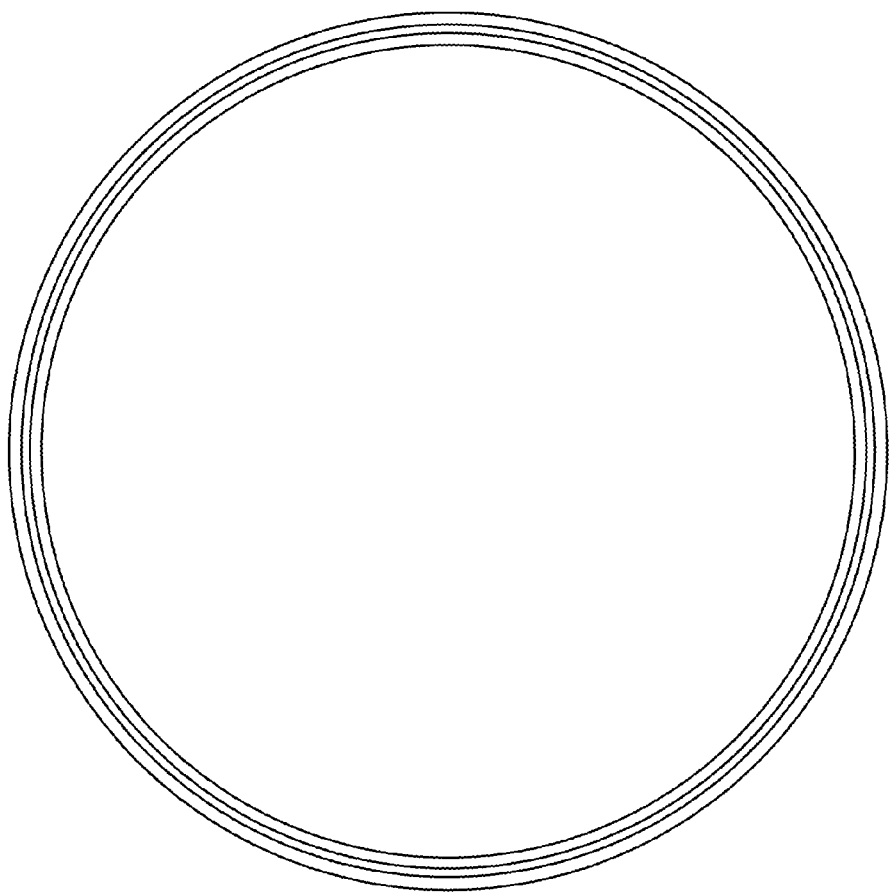
FIG. 8 is a plan view showing another embodiment of a sealing member of the present invention.

For example, although the sealing member has a substantially rectangular ring shape in the present embodiment, it may be formed in an annular shape as shown in FIG. 8, and the shape thereof can be freely selected.

Further, although the four connecting portions of the sealing device are provided in a diagonal shape of the retainer member in the above embodiment, it is not limited to this embodiment and the sealing member may be retained by the retainer member through three connecting portions or may be retained through two connecting portions.

Furthermore, the shape of the retainer member can be also freely deformed with respect to the first surface or second surface to which the retainer member is attached, and the connecting portions can be appropriately and freely provided in accordance with the shape of this retainer member.

In addition, the present invention is not limited to the above embodiments and various changes and modifications can be made within the scope of the present invention unless departing from the spirit thereof.

REFERENCE CHARACTERS LIST

1 . . . Sealing member
2 . . . First protrusion
3 . . . Second protrusion
4 . . . Groove
5 . . . Metal plate
8 . . . First remaining portion
15 . . . Second remaining portion
16 . . . Intersection
100 . . . First surface
101 . . . Second surface

The invention claimed is:

1. A sealing member which is a metallic sealing member arranged so as to be interposed between a first surface and a second surface of an object to be sealed which are facing each other, comprising:
 a first protrusion protruding toward the first surface;
 a pair of second protrusions protruding toward the second surface, and
 a groove formed between the pair of second protrusions, wherein
 the first protrusion is arranged between the paired second protrusions,
 distal end portions of the first protrusion and second protrusions are mutually parallel flat surfaces,
 in a transverse section perpendicular to an extending direction of the sealing member, the groove is arch-shaped, and each of two opposite sides of the first protrusion is joined to one of the second protrusions by a respective third surface and a respective fourth surface that meet at a corresponding intersection, wherein a vertical distance from each intersection to the second surface is smaller than a vertical distance from the respective intersection to the first surface, the intersections being formed at respective outwardmost locations of the transverse section in a transverse direction,
 in the case where a force is applied to the sealing member from the first surface and the second surface and the sealing member is in a fully closed state, each inner edge of the pair of second protrusions is brought into tight contact with the second surface and each outer edge of the pair of second protrusions moves away from the second surface and only the first protrusion is brought into tight contact with the first surface, and the sealing member contacts the object to be sealed only at contact points between the first protrusion and the first surface and between the pair of second protrusions and the second surface, and
 the sum of an area of contact between the sealing member and the first surface and an area of contact between the sealing member and the second surface in the case where a force is applied to the sealing member from the first surface and the second surface is equal to or smaller than the sum of an area of contact between the sealing member and the first surface and an area of contact between the sealing member and the second surface in the case where a force is not applied to the sealing member from the first surface and the second surface.

2. The sealing member according to claim 1, wherein the distal end portion of the first protrusion is a flat surface which is parallel to the first surface, and
 the distal end portions of the second protrusions are flat surfaces which are parallel to the second surface.

3. The sealing member according to claim 1, wherein, in the transverse section perpendicular to the extending direction of the sealing member,
 a side surface of the first protrusion is curved so that a width of the first protrusion is widened toward the second surface from the first surface, and
 a side surface of each of the second protrusions is curved so that a width of each of the second protrusions is widened toward the first surface from the second surface.

4. The sealing member according to claim 1, wherein the flat surfaces of the first protrusion and second protrusions are polished.

5. The sealing member according to claim 1, wherein a shape of the transverse section is a symmetrical shape.

6. A sealing device comprising:
 the sealing member as defined in claim 1; and
 a retainer member which is provided in a periphery of the sealing member for retaining the sealing member and which is positioned by the first surface or second surface.

7. A method of manufacturing a sealing member which is a metallic sealing member arranged so as to be interposed between a first surface and a second surface which are facing each other, comprising:
 disposing a metal member having mutually parallel front and rear surfaces so that the front surface faces the first surface and the rear surface faces the second surface;
 a first step of masking a predetermined region of the front surface of the metal member and etching from the front surface side thereof to form a first remaining portion that is not removed by the etching, wherein the first remaining portion is formed as a first protrusion protruding toward the first surface; and
 a second step of masking a predetermined region of the rear surface of the metal member and etching from the rear surface side thereof to form a second remaining portion that is not removed by the etching, wherein the second remaining portion is formed as a pair of second protrusions protruding toward the second surface, wherein the first protrusion formed in the first step is arranged between the paired second protrusions formed in the second step, each of two opposite sides of the first protrusion is joined to one of the second protrusions by a respective third surface and a respective fourth surface that meet at a corresponding intersection, wherein a vertical distance from each intersection to the second surface is smaller than a vertical distance from the respective intersection to the first surface, the intersections being formed at respective outwardmost locations of a transverse section perpendicular to an extending direction of the sealing member, in a transverse direction, in the case where a force is applied to the sealing member from the first surface and the second surface, the sealing member contacts an object to be sealed only at contact points between the first protrusion and the first surface and between the pair of second protrusions and the second surface, and the sum of an area of contact between the sealing member and the first surface and an area of contact between the sealing member and the second surface in the case where a force is applied to the sealing member from the first surface and the second surface is equal to or smaller than the sum of an area of contact between the sealing member and the first surface and an area of contact between the sealing member and the second surface in the case where a force is not applied to the sealing member from the first surface and the second surface.

8. The method of manufacturing the sealing member according to claim 7, wherein a vertical distance from a bottom of a groove formed between the paired second protrusions to the second surface is equal to or larger than a vertical distance from an intersection at which the first remaining portion and the second remaining portion meet to the second surface.

9. The method of manufacturing the sealing member according to claim 7, wherein a vertical distance from the intersection at which the first remaining portion and the second remaining portion meet to the second surface is smaller than a vertical distance from the intersection at which the first remaining portion and the second remaining portion meet to the first surface.

10. The sealing member according to claim 1, wherein, in the transverse section perpendicular to the extending direction of the sealing member, an outside facing curved surface of each of the second protrusions is formed concave.

11. The sealing member according to claim 10, wherein, in the transverse section perpendicular to the extending direction of the sealing member, an outside facing curved surface of the first protrusion is formed concave, and the outside facing curved surface of the first protrusion intersects with the outside facing curved surface of each of the second protrusions such that a ridge line is formed.

12. A sealing member which is a metallic sealing member arranged so as to be interposed between a first surface and a second surface of an object to be sealed which are facing each other, comprising:

a first protrusion protruding toward the first surface;

a pair of second protrusions protruding toward the second surface, and a groove formed between the pair of second protrusions, wherein the first protrusion is arranged between the paired second protrusions, distal end portions of the first protrusion and second protrusions are mutually parallel flat surfaces, in a transverse section perpendicular to an extending direction of the sealing member, the groove is arch-shaped, in the case where a force is applied to the sealing member from the first surface and the second surface and the sealing member is in a fully closed state, each inner edge of the pair of second protrusions is brought into tight contact with the second surface and each outer edge of the pair of second protrusions moves away from the second surface and only the first protrusion is brought into tight contact with the first surface, and the sealing member contacts the object to be sealed only at contact points between the first protrusion and the first surface and between the pair of second protrusions and the second surface, the sum of an area of contact between the sealing member and the first surface and an area of contact between the sealing member and the second surface in the case where a force is applied to the sealing member from the first surface and the second surface is equal to or smaller than the sum of the area of contact between the sealing member and the first surface and the area of contact between the sealing member and the second surface in the case where a force is not applied to the sealing member from the first surface and the second surface, and in the transverse section perpendicular to the extending direction of the sealing member, an outside facing curved surface of each of the second protrusions is formed concave, an outside facing curved surface of the first protrusion is formed concave, and the outside facing curved surface of the first protrusion intersects with the outside facing curved surface of each of the second protrusions such that a ridge line is formed.

* * * * *